United States Patent
Haug et al.

(10) Patent No.: US 7,475,355 B2
(45) Date of Patent: Jan. 6, 2009

(54) INTEGRATED E-MAIL SYSTEM

(75) Inventors: Tobias Haug, Heidelberg (DE); Karen A. Gee, Heidelberg (DE)

(73) Assignee: SAP AG, Walldorf (DE)

( * ) Notice: Subject to any disclaimer, the term of this patent is extended or adjusted under 35 U.S.C. 154(b) by 371 days.

(21) Appl. No.: 11/026,022

(22) Filed: Jan. 3, 2005

(65) Prior Publication Data

US 2006/0004720 A1 Jan. 5, 2006

Related U.S. Application Data

(60) Provisional application No. 60/584,140, filed on Jul. 1, 2004, provisional application No. 60/621,362, filed on Oct. 22, 2004.

(51) Int. Cl.
 *G06F 17/00* (2006.01)
(52) U.S. Cl. .................. 715/752; 715/273; 715/733
(58) Field of Classification Search ................ 715/526, 715/751, 273, 752, 733
 See application file for complete search history.

(56) References Cited

U.S. PATENT DOCUMENTS

| | | | |
|---|---|---|---|
| 5,680,615 A * | 10/1997 | Marlin et al. | 707/103 R |
| 5,890,147 A * | 3/1999 | Peltonen et al. | 707/1 |
| 6,601,233 B1 * | 7/2003 | Underwood | 717/102 |
| 7,020,687 B2 * | 3/2006 | Mooney et al. | 709/206 |
| 7,027,997 B1 * | 4/2006 | Robinson et al. | 705/9 |
| 2002/0103818 A1 * | 8/2002 | Amberden | 707/205 |
| 2003/0126136 A1 * | 7/2003 | Omoigui | 707/10 |

OTHER PUBLICATIONS

Trevor, Jonathan, et al, "On the Move: From Deskto to Phonetop: A User Interface for Web Interaction on Very Small Devices", Proceedings of the 14th Annual ACM Symposium on User Interface Software and Technology UIST '01, Nov. 2001, pp. 121-130.*
Sellen, Abigail J., et al, "Web Behavior Patterns: How Knowledge Workers Use the Web", Proceedings of the SIGCHI Conference on Human Factors in Computing Systems: Changing Our World, Changing Ourselves CHI '02, Apr. 2002, pp. 227-234.*

* cited by examiner

*Primary Examiner*—Laurie Ries
(74) *Attorney, Agent, or Firm*—Kenyon & Kenyon LLP (57) ABSTRACT

The present invention provides a system and method for displaying an external user interface in a groupware application to allow a user to access another application from the groupware application. The external user interface may be accessed from an initial screen within the groupware application that may allow a user to choose from multiple external applications. The user interface may then be expanded to also display user interfaces associated with the application that was selected, as well as the user interfaces associated with the e-mail program. With the external user interface, the user may navigate through the external application from the groupware application by sending multiple queries.

20 Claims, 6 Drawing Sheets

EXPANDED FORM USER INTERFACE - 300

| SAP Launchpad | My Worklist | |
|---|---|---|
| Search | Arranged by: Date | Newest on top ▼ |
| Search for [ ] Go! | ☐ SAP Activity Alerts | |
| in [ ▼] | 📧 Bombolowsky, Jens | Di 19:10 |
| Advanced Search | Timesheet due - please fill out the attached form | |
| Views | 📧 Demant, Hilmar | Di 14:58 |
| 🔍 Worklist > > | ... | |
| 📋 Forms | 📧 Piegsa, Ines | Di 9:42 |
| 🔍 Opportunities | Office Integration Update | |
| 📊 Sales Report | ☐ Scheduled and Personal Tasks | |
| Request Product Info | 📧 Dobler, Lucy | Mo 19:20 |
| Create New Task | RE: The rain in spain falls... | |
| Create Quotation | 📧 Dreissigacker, Hanswerner | Mo 14:50 |
| Customize | Status Vienna UI Trainings | |
| | 📧 Pfitzner, Ingo | Mo 11:32 ! |
| | Folder Homepage for Incoming E-mail | |
| | 📧 Hauser, Andreas | Mo 8:10 |
| | FW: MSFT Input: Longhorn-based Application Demos | |
| Offline Activity Log | ☐ Flagged Customer Contacts | |
| You currently have: 3 completed, unsent items | ☐ Product Update Notices | |
| | ☐ Call Center (Incoming Faxes, Compa...) | |
| ✉ Mail | | |
| 📅 Calendar | | |
| 👤 Contacts | | |
| SAP Launchpad | | |

302 → (left panel)
304 → (worklist panel)

---

Timesheet Due - Please fill out the attached form

Bombolowsky, Jens
To: DL AP&A SDS UP User Experience UID; Eberleh, Edmund; Hauser, Andreas Hello All, It's time once again to fill out your weekly timesheet. Attached please find the Excel spreadsheet. If you are a current Vienna user, you can directly input and send your data as well as automatically import your calendar entries from Outlook.

SAP Quick Activity Pane

The following activity has been delegated to you by: Jens Bombolowsky
Please fill out completely. Submit by 7/1/04.

| Timesheet | Calendarweek 27 | (28.6 - 2.7 2004) hour-based | | | SAP |
|---|---|---|---|---|---|
| Name | David Orland | | Sales&Marketing | | |
| Cost Center | 23453 | | | | |
| Day | start | end | duration | Description | Project |
| Monday | 08:00 | 10:00 | 2:00 | Approach to customer | <choose project> |
| | 10:00 | 12:00 | 2:00 | Acquisition meeting | <choose project> |
| | 14:00 | 16:00 | 2:00 | Journey home | <choose project> |
| Tuesday | 08:00 | 10:00 | 2:00 | Prepare Presentation | <choose project> |
| | 10:00 | 12:00 | 2:00 | Sales figures | <choose project> |
| | 14:00 | 16:00 | 2:00 | Discussion | <choose project> |
| Wednesday | | | 8:00 | Public Holiday | |
| Thursday | 08:00 | 10:00 | 2:00 | Get new laptop | <choose project> |
| | 10:00 | 12:00 | 2:00 | Software-Installations | <choose project> |
| | 14:00 | 16:00 | 2:00 | Appointment Statistic | <choose project> |
| Friday | 08:00 | 10:00 | 2:00 | Prepare presentation | <choose project> |
| | 10:00 | 12:00 | 2:00 | Sales figures | <choose project> |
| | 14:00 | 16:00 | 2:00 | Discussion | <choose project> |
| Total | | | 32:00 | | |
| Time absent | | | 8:00 | | |

[Import Calendar Data] [Attachments >]     [Submit]

306 — (form panel)
308 — Import Calendar Data
310 — Attachments
312 — Submit

INTEGRATED E-MAIL SYSTEM

CROSS REFERENCE TO RELATED APPLICATIONS

This application claims priority to provisional application Nos. 60/584,140 filed on Jul. 1, 2004 and 60/621,362 filed on Oct. 22, 2004, all of which is incorporated by reference herein.

BACKGROUND

Businesses often rely on computer systems to provide services to customers. For example, businesses may rely on electronic communications such as electronic mail (e-mail) to convey information. Businesses may also rely on other computer software applications to provide services for customers. For example, a sales organization may use other computer software applications to manage contacts with potential customers, as well as relations with current customers. Information used by these other business applications may be maintained by a backend database that is not accessible to the e-mail system. For example, a sales company that routinely sells items to the same customers may have contact information for these customers stored in a backend database so that it is integrated with, for example, accounts payable systems.

Employees of businesses are often required to use multiple computer software programs to provide services. For example, a sales manager may check one program that manages contacts with customers to see when a potential customer was last contacted and then transmit an e-mail using another program. This may require opening and closing multiple applications. Additionally, there may be no integration between the various computer programs that a sales manager must use. The sales manager must remember the appropriate application for the function that is selected, locate that application and then open it to perform the function. An employee would benefit from an integrated system that provides a unified access point for various applications.

BRIEF DESCRIPTION OF THE DRAWINGS

FIG. 3 illustrates an expanded form user interface according to one embodiment of the invention.

DETAILED DESCRIPTION

The present invention provides a system and method for displaying an external user interface in a groupware application to allow a user to access another application from the groupware application. The external user interface may be accessed from an initial screen within the groupware application that may allow a user to choose from multiple external applications. The user interface may then be expanded to also display user interfaces associated with the application that was selected, as well as the user interfaces associated with the e-mail program. With the external user interface, the user may navigate through the external application from the groupware application by sending multiple queries.

Figure 1:
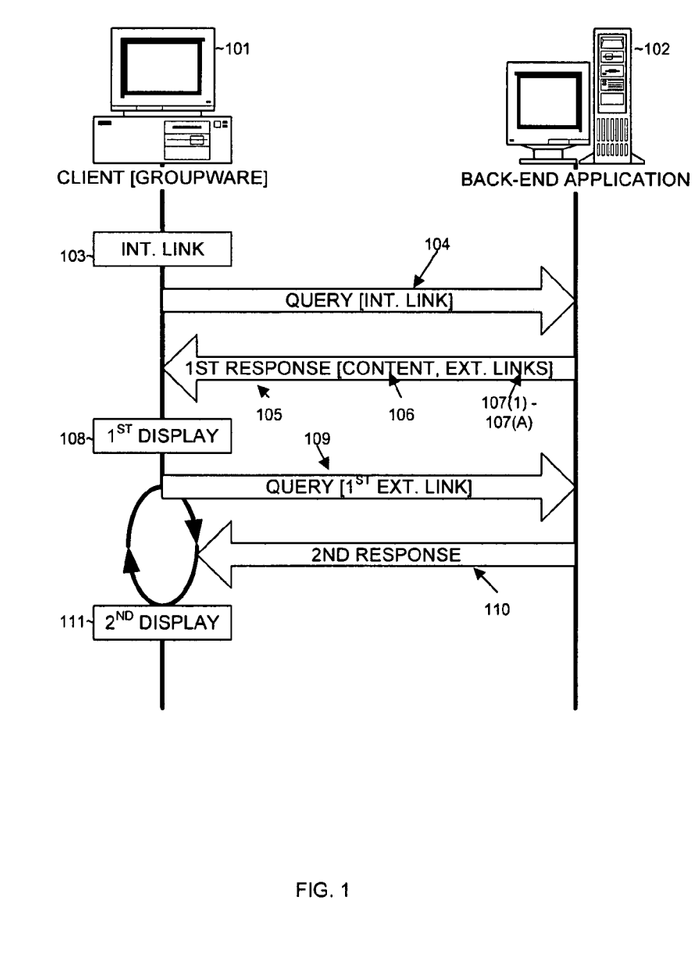
FIG. 1 depicts an integrated display process according to one embodiment of the invention.

FIG. 1 shows an integrated display process 100 according to one embodiment of the invention. Integrated display process 100 is the process that is performed to display an integrated user interface comprising user interface components from both groupware application 101 and backend application 102.

Groupware application 101 may be any set of instructions that can be processed by a programmable processor that supports multiple users working on related tasks. An application may comprise a set of computer instructions and files that provides a specific function to a user. A groupware application 101 is one type of application that provides electronic communications services to a user. Groupware application 101 may help users coordinate and keep track of ongoing projects together. One aspect of groupware application 101 is a messaging system that allows notification of and response by team members. Groupware application 101 may be a Microsoft Outlook e-mail program, SMS or MMS text message program available with a cellular phone, or any other electronic messaging program.

Backend application 102 may be any application that provides a service other than electronic communications and is external to groupware application 101. Backend application 102 may be a project management application, sales activity application, scientific application, Web Browser application, word processing application or a spreadsheet application. Backend application 102 is also referred to herein as external application 102 and may reside in a separate set of application files that are stored locally, on the World Wide Web or on an external server or database. These files may be stored according to any format used for electronic file storage, such as an HyperText Markup Language (HTML) format.

The groupware application 101 may allow access to the backend application 102. Groupware application 101 may include a screen with controls that each correspond to an available external application. For example, a groupware application 101 may have a screen that provides access to one or more project management applications, sales activity applications, scientific applications, Web Browser applications, word processing applications or spreadsheet applications. An exemplary point of access is shown below.

| Select | Application |
|---|---|
| ☐ | Manage Ongoing Projects |
| ☐ | View Current Sales Activities |
| ☐ | Create a New Document |

An operator may select one of the possible external applications while working in groupware application 101. In the example above, a user may choose to manage ongoing projects from groupware application 101. To make this choice, while working in groupware application 101, the user may simply click on the select control indicating that the user wishes to manage ongoing projects.

The groupware application 101 may access the selected external application 102 by using an internal link 103 that allows access to external files, such as HTML files. The internal link 103 may be used within the groupware application 101 to point to the location of the backend application 102 that was selected. The backend application 102 may be any external application that may be accessed via any wired or wireless connection. In an alternate embodiment of the invention, backend application 102 is stored locally. The link 103 may be the path name providing the location of the backend application 102.

The groupware application 101 may send first query 104 to the selected backend application 102 using internal link 103.

If groupware application 101 provides access to more than one external application, the groupware application 101 may first identify which application was selected by the user. The groupware application 101 then locates the internal link 103 corresponding to the selected backend application 102. A query is sent to the backend application 102 to retrieve information to display an external user interface.

The groupware application 101 may receive a first response 105 from the backend application 102. The backend application 102 may provide information that is used to display a main menu allowing a user to navigate backend application 102 in the same way that a user would navigate backend application 102 from a portal, World Wide Web site or any other on-line connection to backend application 102. The first response 105 may comprise content 106 and external links 107(1)-107(A). The backend application 102 may take a snapshot of the user interface as it exists when the first query 104 is received and send the content 106 and links 107(1)-107(A) captured in this snapshot to groupware application 101 in the first response 105.

The content 106 received in the first response 105 is displayed, as reflected by step 108. The user may access controls that are linked to additional user interfaces via external links 107(1)-107(A) that were received in first response 105. A user may navigate the backend application 102 using controls that were provided in the first response 105. Selection of a control may generate a second query 109, which is sent to backend application 102 using a first external link 107(1) that was transmitted in first response 105.

Backend application 102 may send a second response 110 in response to second query 109. Second response 110 may comprise content that is displayed, as reflected by second display 111.

Figure 2:
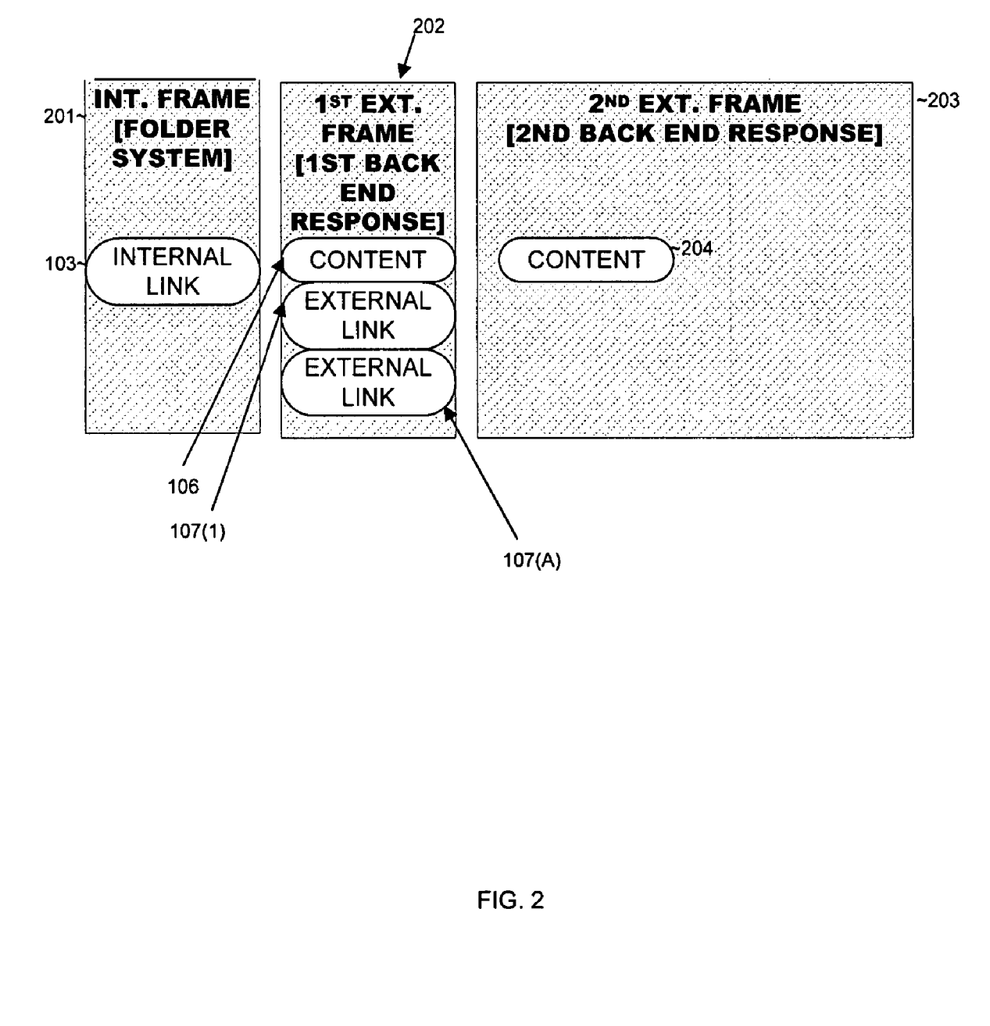
FIG. 2 shows an integrated display according to one embodiment of the invention.

FIG. 2 depicts an integrated display 200 according to one embodiment of the invention. Integrated display 200 may be any user interface that displays data to a user from both a groupware application 101 and a backend application 102. Internal frame 101, first external frame 202 and second external frame 203 may be part of a graphical user interface for providing data to a user, such as user interface of a personal computer, cellular telephone, personal data assistant or any other electronic device. Internal frame 101, first external frame 202 and second external frame 203 may each be a screen comprising various controls that allow a user to navigate to other screens.

The internal frame 201 may be a first spatial area of display that represents a folder system. Each folder in the folder system may have defined a link to a file system for storage of data items that are stored in the respective folder. Within internal frame 201 may be an access point that allows an operator to choose among available external applications. The internal frame 201 may display a user interface that is organized in folders. Some of the folders may relate to services provided by groupware application 101. Other of the folders may provide access to services provided by available external applications. Once a user selects an external application 102, the selected external application 102 is accessed using internal link 103.

Upon receipt of an operator's initial selection to use backend application 102, a first external frame 202 may be displayed. The first external frame 202 is a second spatial area of display that displays the content 106 that was received in first response 105. First external frame 202 may be a main menu, home page or other initial screen that provides controls allowing an operator to select options that link to various other frames provided by backend application 102 so that the operator may navigate the backend application 102 and review information and use the various services provided by it. First external frame 202 may comprise multiple external links 107(1)-107(A) that link to data items of the backend application 102. If a user selects an option to review information or use a service provided by the backend application 102, a second query 109 may be sent from groupware application 101 to the backend application 102 using the first external link 107(1) that was transmitted in first response 105.

In response to the second query 109, the backend application 102 may provide a second response 110 including content 204 that is displayed in a second external frame 203. The second external frame 203 is a third spatial area of display that stores data items referenced by external links 107(1)-107(A) when activated. The allows the user to review the information that was selected.

A user may navigate the backend application 102 by selecting additional functions within external frames displayed by groupware application 101. These additional selections may generate additional queries to external links 107(1)-107(A) provided in one or more responses from backend application 102. Additional external frames may be displayed as selected by the user.

FIG. 3 illustrates an expanded timesheet user interface 300 according to one embodiment of the invention. Expanded time sheet user interface 300 may comprise a launchpad screen 302, a worklist screen 304 and a form screen 306. Launchpad screen 302 may reside in e-mail application 102 and be used to select from external applications. Applications that may be accessed may include a worklist, forms, opportunities, and sales reports.

Using launchpad screen 302, a user may select a worklist application. Worklist screen 304 may allow a user to view a worklist that is stored on, for example, a backend database. Worklist 304 may be prioritized using a scheme that is user-friendly, for example, a scheme organized by priority or category of the task. Exemplary categories include an activity alert, a scheduled and personal task, a flagged customer contact, a product update notice, and a call center task, e.g., incoming facsimiles. Customers may indicate the priority or category of the task by selecting the priority or category when the task is entered in the worklist.

A user may select from various tasks shown in worklist screen 304 and a form may be displayed in form screen 306. The user may enter data in form screen 306. For example, a user may import data from external application 102 by selecting import control 308. Data may be imported into form screen from external application 104, or another application by sending a query 104 and receiving a response 105. A document may be attached to the form using an attachment control 310. Data may also be manually entered into the form using form screen 306. This data may be populated into external application 102 when a user selects submit control 312. The data may be populated by sending a query 104 comprising the data to be stored. A response 105 will be returned to indicate that the data was successfully entered into external application 102. If data cannot be entered into external application 102, an error message may be returned.

Figure 4:
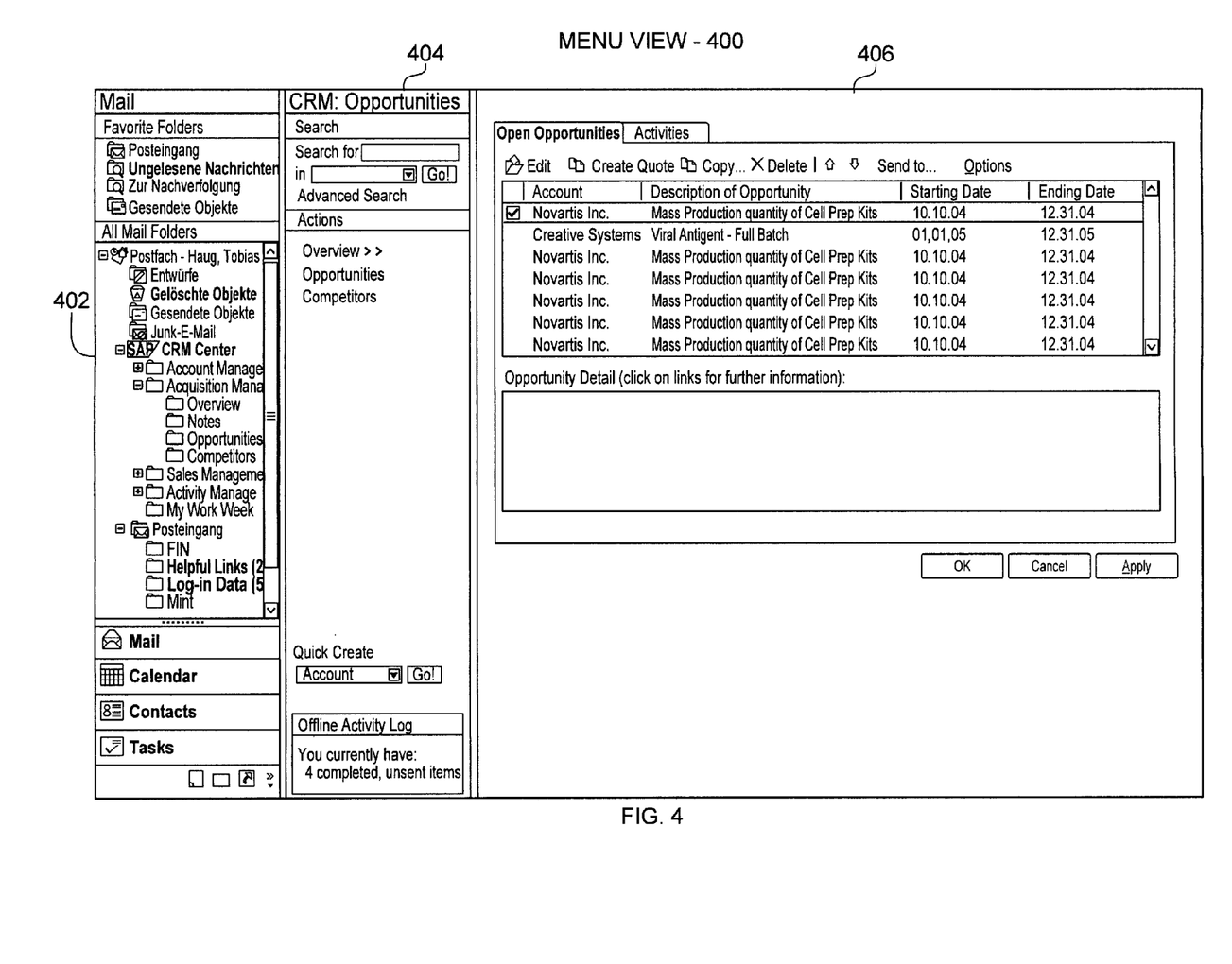
FIG. 4 illustrates a menu view according to one embodiment of the invention.

FIG. 4 illustrates a menu view 400 according to one embodiment of the invention. Menu view 400 may include folder screen 402, navigation screen 404 and search screen 406. Folder screen 402 may be a user interface provided by e-mail application 102 to display folders that store electronic communications transmitted using e-mail application 102. Folder screen 402 may also include folders stored by a backend system, such as a Customer Relationship Management (CRM) center. A user may select a folder, such as opportunities, within folder screen 402. A first query 104 may be sent to external application 102 so that an initial screen corresponding to selected external application 102 may be displayed to the user.

External application 104 may provide in a response 105 data needed to display a navigation screen 404. Navigation screen 404 may be displayed along with folder screen 402. A user may select an action using navigation screen 404. This action may be transmitted in a second query 109 to external application 104. External application 104 may return in a second response 110 data needed to display search screen 406.

Search screen 406 may be displayed to a user. The user may perform a search. The search may be transmitted in a third query so that external application 102 can perform the search. External application 102 may provide the search results in a third response so that the user can make a selection. The selection may be transmitted to external application 102 in a fourth query and a fourth response may be received to display the user's selection. In this manner a user may interact with external application 102 via groupware application 101.

Figure 5:
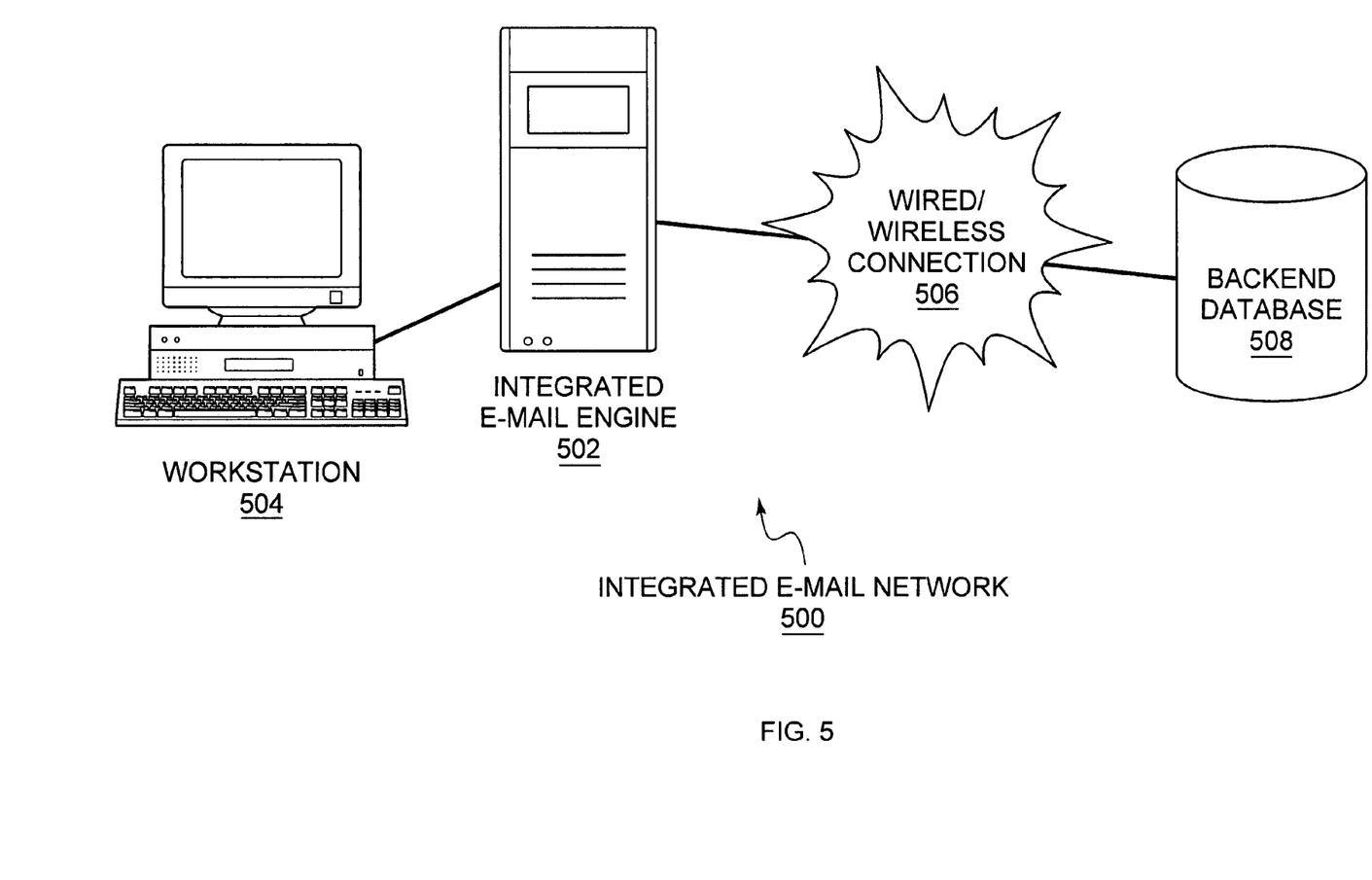
FIG. 5 illustrates an integrated e-mail network according to one embodiment of the invention.

FIG. 5 illustrates an e-mail network according to one embodiment of the invention. E-mail network 500 may comprise and e-mail engine 502 that processes incoming e-mails and provides integrated display 200. E-mail engine 502 may be connected to workstation 504 so that a user may view a graphical user interface providing integrated display 200. E-mail engine 502 may also be connected to backend database 508 via wired/wireless connection 506. Backend application 102 may reside on e-mail engine 502, workstation 504 or backend database 508.

Workstation 504 may be used to view incoming e-mails and to view integrated display 200. Workstation 504 may be any programmable processor connected to a machine-readable medium that can provide a user interface such as a computer having a graphical user interface (GUI), a phone, or a personal data assistant. Such devices may comprise an output device that can provide to a user any form of sensory feedback such as voice, auditory or tactile (e.g., liquid crystal display (LCD), cathode ray tube (CRT), or earpiece) and an input device providing any form of input to the computer including acoustic, speech, or tactile input (e.g., keyboard, mouse, trackball, keypad).

Backend database 508 may be any data stored on any machine-readable medium including any computer program product, apparatus and/or device (e.g., a random access memory (RAM), read only memory (ROM), magnetic disk, optical disk, programmable logic device (PLD), tape or any combination of these devices). Backend database 508 may be stored according to any file format that may be used to organize data, including HTML file format.

Figure 6:
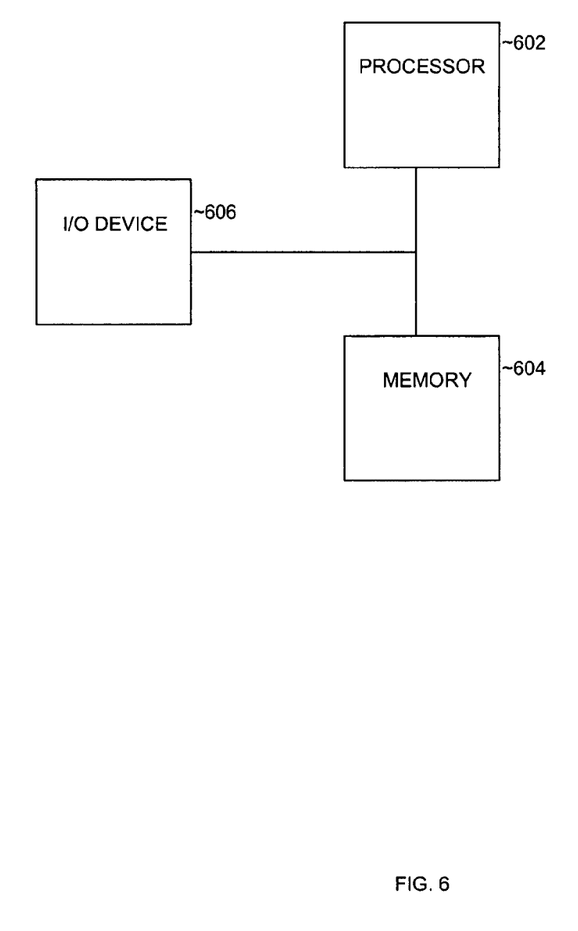
FIG. 6 illustrates an integrated e-mail engine according to one embodiment of the invention.

FIG. 6 illustrates an e-mail engine according to one embodiment of the invention. Integrated e-mail engine 502 includes processor 602, memory 604, and I/O device 606. Processor 602 is connected to memory 604. Processor 602 is also connected to I/O device 606. These connections are direct or via other internal electronic circuitry or components.

Processor 602 may be any programmable processor that executes instructions residing in memory 604 to receive and send data via I/O device 606 including any programmable microprocessor or combination of microprocessors or processors that can operate on digital data, which may be special or general purpose processors coupled to receive data and instructions from, and to transmit data and instructions to, a machine-readable medium. According to one embodiment of the present invention processor 602 is an Intel microprocessor.

Memory 604 may be any machine-readable medium that stores data that is processed by processor 602 including any computer program product, apparatus and/or device (e.g., a random access memory (RAM), read only memory (ROM), magnetic disc, optical disc, programmable logic device (PLD), tape, or any combination of these devices). This may include external machine-readable mediums that are connected to processor 602 via I/O device 606. I/O device 606 may be any coupling that can be used to receive and/or send digital data to and from an external device.

Various implementations of the systems and techniques described here can be realized in any processing systems and/or digital electronic circuitry, integrated circuitry, specially designed ASICs (application specific integrated circuits), computer hardware, firmware, software, and/or combinations thereof.

A number of embodiments of the invention have been described. Nevertheless, it will be understood that various modifications may be made without departing from the spirit and scope of the invention.

What is claimed is:

1. In a groupware application, a graphical user interface executing on a first computer system providing access to data of a second application executing on a second computer system, the user interface comprising:
   a first spatial area of display, displayed on a computer display of the first computing system, representing a folder system and an e-mail communication service program user interface, wherein:
      each folder of the folder system has defined a link to a file system for storage of data items stored in the respective folder,
      a link for a folder associated with the second application executing on the second computer system represents a query to the second application, and
      said second application is not accessible to an e-mail system; and
   a second spatial area of display, displayed on a computer display of the first computing system, to display content of a response from the second application made to the query, wherein the contents of the response comprise a worklist that is prioritized by schedule and product and include:
      information on how the second spatial area of display is to appear, and a main menu of the second application, to allow navigation of the second application.

2. The graphical user interface of claim 1, wherein: the response includes a plurality of second links to data items of the second application, and includes information on how a third spatial area of display is to appear.

3. The graphical user interface of claim 2, wherein the third spatial area of display displays a control that when activated performs a search of the data elements.

4. The graphical user interface of claim 1 wherein the second application provides sales activity management services.

5. The graphical user interface of claim 1, wherein the second application provides customer relationship management services.

6. The graphical user interface of claim 1, wherein the second application resides on a backend database.

7. The graphical user interface of claim 1, wherein the second application resides on a workstation.

8. The graphical user interface of claim 1, wherein a third spatial area of display, displayed on a computer display of the first computing system, to display, in response to a selection of main menu items displayed in the second spatial area of display, contents of the second application executing on the second computer system, whereby a user may edit and save the contents of the second application executing on the second computer system and whereby the user receives an error message if the edits cannot be entered into the second application.

9. In a groupware application, a method for displaying content of a second application comprising:
   displaying, in a first spatial area of a display of a first computer system executing the groupware application, the content of the groupware application, an email communication service program's user interface and a control that when activated links to the second application executing on a second computer system, wherein said second application is not accessible to an email system; and responsive to selection of the control by an operator, displaying, in a second spatial area of display of the first computer system, content of the second application executing on the second computer system, said content received in a response sent from the second application, wherein the contents of the response comprise a worklist that is prioritized by schedule and product and include information on how the second spatial area is to appear and include main menu items of the second application, to allow navigation of the second application.

10. The method of claim 9, further comprising: upon editing Of the content by an operator, sending the edited content to the second application.

11. The method of claim 9 wherein the second application provides sales activity management services.

12. The method of claim 9 wherein the second application provides customer relationship management services.

13. The method of claim 9, wherein responsive to the selection of a main menu item in the second spatial area of display, displaying, in a third spatial area of display of the first computer system, contents of the second application executing on the second computer system, whereby an operator may edit the contents of the second application executing on the second computer system.

14. A computer readable medium storing thereon program instructions that, when executed, cause an executing device to:

display, in a first spatial area of display of the executing device, content of a groupware application, an email communication service program's user interface, and a control that when activated links to a second application, said second application executing on a computer system separate from the executing device of the groupware application and said second application is not accessible to an email program; and responsive to selection of the control by an operator, display, in a second spatial area of display of the executing device, content of the second application, said content received in a response sent from the second application, wherein the contents of the response comprise a worklist that is prioritized by schedule and product and include information on how the second spatial area is to appear and include main menu items of the second application, to allow navigation of the second application.

15. The computer readable medium of claim 14 wherein the second application provides sales activity management services.

16. The computer readable medium of claim 14 wherein the second application provides customer relationship management services.

17. The computer readable medium of claim 14, wherein responsive to the selection of a main menu item in the second spatial area of display, displaying, in a third spatial area of display of the first computer system, contents of the second application executing on the second computer system, whereby an operator may edit and save the contents of the second application executing on the second computer system.

18. In a groupware application, a graphical user interface executing on a first computer system providing access to data of a second application executing on a second computer system, the user interface comprising:

a first spatial area of display, displayed on a computer display of the first computing system, representing a folder system and an e-mail communication service program user interface, wherein:
   each folder of the folder system has defined a link to a file system for storage of data items stored in the respective folder,
   a link for a folder associated with the second application executing on the second computer system represents a query to the second application; and a second spatial area of display, displayed on a computer display of the first computing system, to display content of a response from the second application made to the query, wherein the contents of the response comprise a worklist that is prioritized by schedule and product and include:
   information on how the second spatial area of display is to appear, and a main menu of the second application, to allow navigation of the second application.

19. In a groupware application, a method for displaying content of a second application comprising:

displaying, in a first spatial area of a display of a first computer system executing the groupware application, the content of the groupware application, an email communication service program's user interface and a control that when activated links to the second application executing on a second computer system; and responsive to selection of the control by an operator, displaying, in a second spatial area of display of the first computer system, content of the second application executing on the second computer system, said content received in a response sent from the second application, wherein the contents of the response comprise a worklist that is prioritized by schedule and product and include information on how the second spatial area is to appear and include main menu items of the second application, to allow navigation of the second application.

20. A computer readable medium storing thereon program instructions that, when executed, cause an executing device to:

display, in a first spatial area of display of the executing device, content of a groupware application, an email communication service program's user interface, and a control that when activated links to a second application, said second application executing on a computer system separate from the executing device of the groupware application; and responsive to selection of the control by an operator, display, in a second spatial area of display of the executing device, content of the second application, said content received in a response sent from the second application, wherein the contents of the response comprise a worklist that is prioritized by schedule and product and include information on how the second spatial area is to appear and include main menu items of the second application, to allow navigation of the second application.

* * * * *